(12) United States Patent
Ramprashad et al.

(10) Patent No.: US 10,187,504 B1
(45) Date of Patent: Jan. 22, 2019

(54) ECHO CONTROL BASED ON STATE OF A DEVICE

(71) Applicant: Apple Inc., Cupertino, CA (US)

(72) Inventors: Sean A. Ramprashad, Los Altos, CA (US); Aram M. Lindahl, Menlo Park, CA (US); Joseph M. Williams, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 15/275,311

(22) Filed: Sep. 23, 2016

(51) Int. Cl.
*H04M 1/60* (2006.01)
*H04R 3/00* (2006.01)

(52) U.S. Cl.
CPC .......... *H04M 1/6033* (2013.01); *H04R 3/005* (2013.01); *H04R 2499/11* (2013.01)

(58) Field of Classification Search
CPC ... G06F 3/0416; G06T 19/006; G10L 19/167; H04M 1/6033; H04R 3/005; H04R 29/005
USPC ..... 345/156, 173; 379/388.07; 381/66, 71.1, 381/26, 56; 455/569.1, 570, 563; 704/226, 233; 715/863; 73/609; 324/309; 333/17.3
See application file for complete search history.

(56) References Cited

U.S. PATENT DOCUMENTS

| | | | | |
|---|---|---|---|---|
| 4,226,122 A * | 10/1980 | Lund | .................. | G01N 29/0618 702/39 |
| 6,191,663 B1 * | 2/2001 | Hannah | ............... | G06F 13/4086 326/30 |
| 9,131,041 B2 | 9/2015 | Laska et al. | | |
| 9,184,791 B2 | 11/2015 | Joseph | | |
| 9,516,409 B1 | 12/2016 | Ramprashad et al. | | |
| 9,693,137 B1 * | 6/2017 | Qureshi | .................. | H04R 3/005 |
| 2012/0259628 A1 * | 10/2012 | Siotis | ..................... | H04R 3/005 704/233 |
| 2013/0076357 A1 * | 3/2013 | Grodzki | ................. | A61B 5/062 324/309 |
| 2013/0129102 A1 * | 5/2013 | Li | ......................... | H04M 9/082 381/71.1 |
| 2013/0196715 A1 * | 8/2013 | Hansson | ................. | H04M 1/19 455/563 |
| 2013/0230180 A1 * | 9/2013 | Thormundsson | ...... | H04R 29/00 381/56 |
| 2013/0243213 A1 * | 9/2013 | Moquin | .................. | H04B 3/20 381/71.1 |

(Continued)

*Primary Examiner* — Gerald Gauthier
(74) *Attorney, Agent, or Firm* — Womble Bond Dickinson (US) LLP

(57) ABSTRACT

A device and a corresponding method are provided to tune parameters of an echo control process without re-initializing the echo control process and without interrupting a playback process. A state of the device and environment around the device is computed during use of the device given information from sensors. Such sensors can give information on the position of the device, the orientation of the device, the presence of a proximate object, or handling of the device resulting in occlusion of microphones and loudspeakers, among other things. The computed state of the device is mapped to an associated device state code from among a plurality of device state codes. The parameters of the echo control process are tuned either according to the associated device state code, or a change in such a code, during use of the device.

24 Claims, 5 Drawing Sheets

(56) References Cited

U.S. PATENT DOCUMENTS

| | | | |
|---|---|---|---|
| 2013/0332156 A1* | 12/2013 | Tackin | H04M 1/6041 |
| | | | 704/226 |
| 2014/0112487 A1* | 4/2014 | Laska | H04M 9/082 |
| | | | 381/66 |
| 2014/0179380 A1* | 6/2014 | Roh | H04M 1/0268 |
| | | | 455/569.1 |
| 2014/0211951 A1* | 7/2014 | Paranjpe | H04R 3/005 |
| | | | 381/26 |
| 2014/0274218 A1* | 9/2014 | Kadiwala | H04M 1/6041 |
| | | | 455/570 |
| 2015/0046886 A1* | 2/2015 | Goel | G06K 9/00342 |
| | | | 715/863 |
| 2015/0050967 A1* | 2/2015 | Bao | H04M 9/082 |
| | | | 455/570 |
| 2015/0172811 A1* | 6/2015 | Sassi | H04R 3/002 |
| | | | 381/71.1 |
| 2015/0363035 A1* | 12/2015 | Hinckley | G06F 3/0383 |
| | | | 345/173 |
| 2016/0225187 A1* | 8/2016 | Knipp | G06T 19/006 |
| 2016/0253044 A1* | 9/2016 | Katz | G06F 3/017 |
| | | | 345/156 |
| 2016/0284358 A1* | 9/2016 | Liu | G10L 19/167 |
| 2017/0300170 A1* | 10/2017 | Hinckley | G06F 3/0383 |
| 2018/0077507 A1* | 3/2018 | Bernal Castillo | H04R 29/005 |

* cited by examiner

ECHO CONTROL BASED ON STATE OF A DEVICE

FIELD

One aspect of the disclosure herein relates to digital signal processing techniques for echo control in a device.

BACKGROUND

Electronic devices, in particular those used for two-way person-to-person communication or audio and video recording, have microphones in order to receive speech from a near-end talker, and loudspeakers in order to playback audio signals that may include speech from a far-end talker received from a far-end device. In some cases, the audio signals output by the loudspeakers include sound internally generated by the device itself, such as alerts, music, and ring-tones. Typical examples of such electronic devices include portable telecommunications devices (mobile telephones), desktop computers, laptop computers, tablet computers and audio systems for homes and vehicles. In addition, many of these devices can be used together with external devices having their own microphones and loudspeakers.

In situations where microphones of the electronic device are receiving speech at the same time that its loudspeakers are outputting audio signals, the signal output by the loudspeakers may be captured by the microphones due to the proximity of the microphones to the loudspeakers, or the playback levels in the loudspeakers, or the sensitivity of the microphones. In a two-way communication application, the output audio signal often originates at a far-end device. When this playback signal is captured by the microphone and is then sent to the far-end device for playback to the far-end user, this signal is perceived by the far-end user as an echo. Echo can be picked up simultaneously with desired speech from a near-end speaker, often degrading the quality of the desired speech and communication experience and making comprehension difficult. In addition, there can be playback signals that do not originate on the far-end device, but in the near-end device itself, such as alerts, where it is desirable that such signals be either not recorded by the near-end device or not sent to the far-end user. Effective removal of such echo originating with a far-end signal, and/or what is termed as echo in this description though originating locally in the far-end device, is of interest.

SUMMARY

Generally, the embodiments disclosed herein aim to maintain quality of a desired speech signal by tuning parameters of an echo control process based on a device state code or a change in a device state code. In one embodiment, a state of a device is computed based on information received from sensors that may be internal or external to the device. The sensors may provide information regarding, for example, a position of the device relative to a frame of reference, the presence of an object proximate to the device, the motion of the device, and/or the temperature of the device. The state is then mapped to, or associated with, a device state code. In one embodiment, a look up table stored on the device includes a number of states and their respective device state codes. This look up table may have been pre-determined by the device itself, by sensing various conditions in the environment over a period of time, computing states of the device based on the sensed conditions and assigning each state to a respective device state code. In other embodiments, a look up table is not used and the echo control algorithms are configured directly. There may be more than one state, or set of sensor measurements, that is assigned the same device state code. In addition, simply noting that there is change in a quality of a sensed condition can be in itself a particular device state code of interest. Such device state codes may then be provided to an echo controller in the device so that the echo controller may be made aware of the environment or scenario the device is operating in. In particular, the echo controller may be warned in a change in the state of the system which has implications to changes in the types and qualities of echo the system may have to control. Thus when such state changes are mapped to appropriate device state codes, the device may appropriately respond by tuning the parameters of the echo control process. One such change of particular interest is to have the echo control process put in a more aggressive state of learning knowledge of the coupling between loudspeakers and microphones. This can be of interest when such coupling has either changed, or is in a scenario where the coupling is expected to change more often than in other scenarios. Another example of a change of interest is a change in assumptions on the accuracy and use of such knowledge. Different algorithms within the echo control process require different levels of such accuracy, and some are more appropriate in cases when such knowledge is less or more accurate. The echo control process, which includes different processes and algorithms, works to reduce the echo component included in a signal captured by a microphone. It does so even when the captured signal includes desired speech. Thus, in response to a device state code, or a change in the code, the device may adjust parameters for estimating, controlling, removing or suppressing the echo component. The parameters of the echo control process may be tuned based on the device state code without re-initializing or re-structuring the processing elements used in the echo control process. Essentially, the algorithmic chain of the echo control process can remain unchanged in the embodiments herein. It is therefore possible to maintain smooth audio playback and recording by the device, since the tuning is performed without interrupting an echo control process or changing the algorithmic chain. Rather, the existing chain is enhanced with side information from the device state codes in order for the echo control process to operate more effectively.

The echo controller may include algorithms and processes such as a linear echo canceler, a residual echo suppressor and an echo gate. Parameters that influence the operation of the linear echo canceler, the residual echo suppressor and the echo gate may be tuned based on the device state code. In one embodiment, the linear echo canceler performs a linear echo cancellation process to estimate the echo component of the audio signal by determining an estimated impulse response which represents an estimate of the transformation between a reference signal sent to the loudspeaker and a corresponding audio signal (including an echo component) that is received on the microphone in response to output of the reference signal by the loudspeaker. The impulse response may be characterized by a time-varying linear filter having a frequency support. The accuracy of this impulse response estimate may have a direct effect on the efficiency of the linear echo cancelation process. The assumed accuracy of the impulse response estimate can also have an influence on the operation of the linear echo canceler, for example if the linear echo canceler determines the estimate is inaccurate it may influence the adaptation process in order to arrive at a more accurate estimate more quickly. The assumed accuracy of the impulse response estimate can also have an influence on other elements in the echo control process, such as the residual echo suppressor and the echo gate. For example, if such elements know the estimate is inaccurate they may be inclined to trust information from the linear echo canceler less and/or suppress more components of the signal they are expecting are related to echo knowing that the linear echo canceler is not operating as efficiently as it should or could.

In one embodiment, the linear echo canceler computes an adaptation speed that controls how fast the estimated impulse response can change. In this case, the parameters driving the echo canceler determine computation of the adaptation speed, such parameters being selected in response to the device state code.

In the linear echo canceler, a linear echo estimate is computed using the impulse response, and this is subtracted from the microphone acquired audio signal (also referred to as the acquired microphone signal) in order to help cancel the echo component on this signal. In one embodiment, the linear echo canceler computes a second impulse response between a second reference signal and a corresponding second reference audio signal (including an echo component) that is received in response to output of the second reference signal by the loudspeaker, and the second impulse response is used. The second impulse response may also be used to compute the linear echo estimate which is subtracted from the acquired microphone signal to help cancel the echo component. In one embodiment, the linear echo canceler computes a second linear echo estimate by estimating a time delay between the playback reference signal and the microphone signal, scaling the reference signal and aligning the scaled reference signal with the acquired microphone signal based on the estimated delay. In one embodiment the estimated time-delay is estimated by the position of a dominant area, for example the position of a main lobe in an impulse response or the position of a strong cross-correlation between a reference signal and a microphone signal, or from an estimated impulse response. In one embodiment, in the process of operation the linear echo canceler modifies one or more measures of double-talk, where double-talk is characterized by overlapping near-end and output audio signals, a change in the impulse response estimate over a period of time, and/or a level of the linear echo estimates, and/or a level of the impulse response estimates. These measures can also be passed to other modules such as the residual echo suppressor and the echo gate. These are also used internally by the linear echo canceler to help control the algorithm. One of the controls is when to use, and how to use, the second linear echo estimate. Another of the controls is how to determine double-talk. Another of the controls, often influenced by linear echo estimates and determinations of double talk, is how fast to estimate changes in the impulse response. An example of this is the step size in a Least Mean Square (LMS) estimation of the impulse response by matching the reference signal to the microphone signal. A larger step size allows the estimated impulse response to change more rapidly, but using a larger step size can also have detrimental effects when there is strong overlapping of near-end and output signals.

The linear echo canceler produces an output signal, referred to as the echo-canceler-output signal (EC output audio signal), which is then sent, along with potentially other measures, to other processing elements such as a residual echo suppressor and or an echo gate.

The modification and calculation of measures, and the use of a second linear echo estimate, by the echo canceler may be determined by the device state code. In particular, for codes which indicate situations where there is a change in the environment, or a quality of the environment, where it is expected the coupling between the loudspeakers and microphones has changed or is expected to change more rapidly than in a nominal condition, the echo canceler may use, or use more aggressively, information from this second linear echo estimate. Such information may be used to determine double-talk measures and adaptation step-sizes. The echo canceler may also be more cautious in determining the double-talk situation since in the case of a rapidly changing coupling it may be more difficult to distinguish near-end signals from signals related to the output of the loudspeaker. The echo canceler may also be more aggressive in the use of its step size noting that when it can make an update in the estimated impulse response such an impulse response may have changed relatively more than usual.

In one embodiment, based on the EC output audio signal, the reference signal, the impulse response and/or the linear echo estimate, where there may be one or more of each, the residual echo suppressor estimates a residual-echo component remaining after the linear echo canceler cancels the echo component it has estimated and, based on the estimated residual echo component, suppresses certain sub-bands of the EC output audio signal to produce a new signal. In one embodiment, the residual echo suppressor scales the estimated residual echo component up by multiplying the estimated residual-echo component by a factor. This scaling up of the residual echo estimate is especially advantageous in cases in which the linear echo canceler underestimates the linear echo estimate, or the residual echo suppressor originally under-estimates residual echo. The amount of such a scaling up, in particular the value of the linear multiplier, may be determined as a function of the device state code. In particular, for codes which indicate situations where there is a change in the environment, or a quality of the environment, where it is expected the linear echo canceler may not be estimating and removing echo accurately, then such scale up factor and their limits may be larger.

In one embodiment, the residual echo suppressor computes a second linear echo estimate by scaling the reference signal and aligning the scaled reference signal according to a time delay estimate, and uses the second linear echo estimate to estimate the residual-echo component. The use of this secondary linear echo estimate may be determined by the device state code. In particular, for codes which indicate situations where there is a change in the environment, or a quality of the environment, where it is expected the linear echo canceler may not be estimating and removing echo accurately, the residual echo suppressor may use, or use more aggressively, information from this secondary echo estimate. The degree to which this information may be used may be determined based on the device state code.

In one embodiment, the residual echo suppressor suppresses certain sub-bands of the output audio signal based on a comparison of the estimate residual-echo component to the EC output signal, and then determines a scaling factor for each sub-band. The method of determining scaling-factors may be determined in part as a function of the device state code. Scaling-factors may be influenced in particular by the scaling up factor limits and values mentioned earlier. Scaling factors may be further compared to a threshold that may be tuned based on the device state code.

In one embodiment, the echo gate estimates a second residual echo component remaining after the residual echo suppressor suppresses the certain sub-bands of the output audio signal and, based on the estimated second residual-echo component, suppresses the EC output audio signal, or the residual echo suppressor (RES) output audio signal. In one embodiment, the echo gate has a threshold for muting the output audio signal, the threshold being for an acceptable level of the second residual echo component. This acceptable level of residual echo may also be a relative level, determined by comparing the estimated level of the second residual-echo to the estimated level of signals in the EC output or RES output signal that are not deemed not to be related to echo. The echo controller tunes the parameters of the echo control process by adjusting the threshold for muting the output audio signal. The threshold for muting may be one of the following: a threshold of a level of strength of the echo component, a threshold of a level of strength of a linear echo estimate, a threshold of a level of strength of a reference signal, a relative level between a residual echo estimate and an estimate of signals on the microphone that are not related to echo, and a threshold of a change in an impulse response over a period of time, the impulse response being an estimate of the linear transfer function between the reference signal and a corresponding audio signal (including an echo component) that is received on the microphone in response to output of the reference signal by the loudspeaker. In one embodiment, the echo gate includes a timer indicating a first period of time, a second period of time and a third period of time. During the first period of time, the echo gate suppresses the output audio signal aggressively (e.g., more often). During the second period of time, the echo gate suppresses the output audio signal less aggressively than in the first period of time. During the third period of time, the echo gate suppresses the output audio signal less aggressively than in the second period of time. The timer is often reset to start from zero when the echo control system assumes it does not have accurate information on estimated impulse responses. In one embodiment the timer may be reset based on the device state code and or a change in the device state code. In one embodiment the threshold or thresholds for muting may be set based on the device state code and or a change in the device state code.

In one embodiment, the linear echo canceler has a startup flag which when true allows the echo canceler to aggressively update or estimate the impulse response with either little or no assumed prior knowledge of the environment. Once the linear echo canceler improves the impulse response estimate, and the relationship between linear echo estimates and the acquired microphone signal indicates strong matching that implies the estimated impulse response is accurate, the linear echo canceler may change the state of the startup flag to false.

In one embodiment, the linear echo canceler may reset a linear-echo canceler startup flag to true based on the device state code or a change in the code without re-initializing the echo control process in order to notify the echo controller that the linear echo canceler is in a state of learning. This notification is especially advantageous in situations where the linear echo canceler is in a state of learning its parameters (e.g., impulse response) or in a state of re-convergence in estimating the impulse response. This flag can also be shared with other elements such that the other components and processes (e.g., the residual echo suppressor, the echo gate) should be aware and be appropriate in the assumed accuracy of data coming from the linear echo canceler. In situations where a startup flag is true, and or where there is a change in a device state code, or an appropriate device state code, parameters of the residual echo suppressor and the echo gate may be tuned to control echo more aggressively (e.g., suppress the output audio signal more often by methods noted before).

In one embodiment, the plurality of device state codes, which are created from information received from sensors that may be internal or external to the device, indicate one or more of the following: (i) a level or expected range of levels of strength of the echo component relative to a level of strength of a reference signal, (ii) a change in, or situation where there is an expected change in, the level of strength of the echo component relative to a level of strength of a reference signal, (iii) a change in, or situation where there is an expected change in, or a situation where there may more frequent and larger changes in, the impulse response between the reference signal and the corresponding echo component received on the microphone, (iv) a change in, or situation where there is an expected change in, amount of time delay between the echo component on a microphone and the reference signal, (v) a change in, or situation where there is an expected change in, the frequency support of the impulse response over a predefined frequency band, (vi) a change in, or situation where there is an expected change in, an expected strength of the impulse response over the predefined frequency band, and (vii) a change in, or situation where there is an expected change in, the level of components of the echo components which are not linearly related to the reference signal (i.e. non-linear echo components).

Accordingly, by virtue of the embodiments described herein, it is possible to actively compute a state of a device using various internal and external sensors and to associate the state with a device state code, such that a device may use the device state code to dynamically influence the operation of the echo control process, and thus dynamically reduce echo in a more desirable fashion. Of particular interest is how the system responds to sensor information which indicate a change in, or a situation where there is an expected change in, the underlying physical coupling between loudspeakers and microphones and thus a change in the knowledge needed to effectively model and control echo. In addition, since the parameters of the linear echo canceler, the residual echo suppressor and the echo gate may be tuned based on the device state code without re-initializing the echo control process or these modules, it is possible to maintain a fixed and un-interrupted chain of processing for the echo control process (e.g., fixed and unchanged combination of the linear echo canceler, the residual echo suppressor, the echo gate) such that audio playback is not interrupted.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments are now explained with reference to the appended drawings. Whenever aspects are not explicitly defined, the scope of the embodiments described herein are not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

Figure 1:
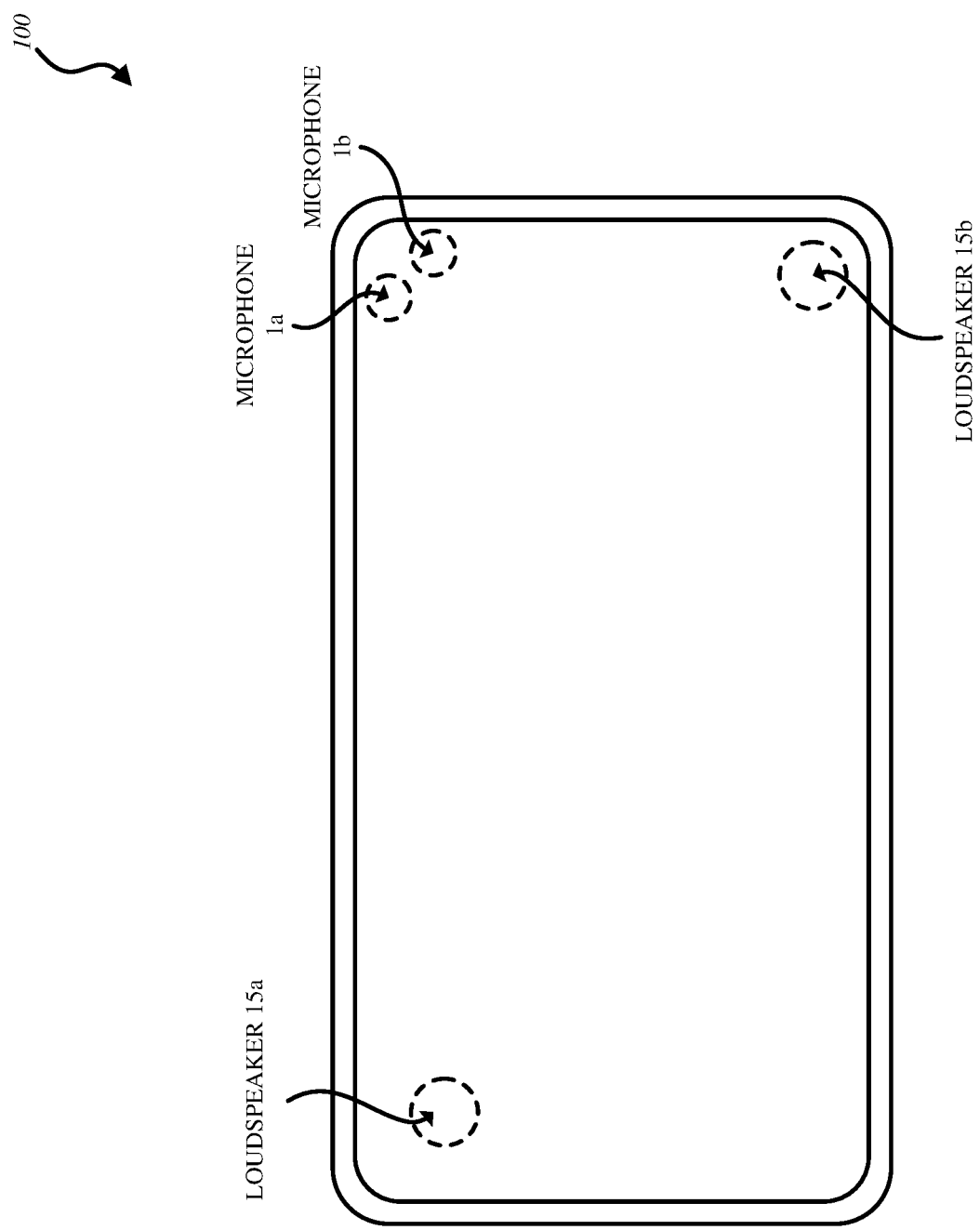
FIG. 1 illustrates a device, such as a laptop or tablet computer, for explaining an example audio system, according to an example embodiment.

The processes described below are performed by a device including an audio system 100 as depicted in FIG. 1 whose user is also referred to as the local voice or primary talker or near-end talker. In most cases the device 100 is portable and thus can be easily handled, positioned and moved by the user. The device 100 can also operate in many different environments. The housing of device 100 contains one or more microphones 1 (two microphones 1a and 1b are illustrated). The housing of the device 100 contains one or more loudspeakers 1 (two loudspeakers 15a and 15b are illustrated). Device 100 may be any electronic device that includes an audio system or a microphone and a loudspeaker, such as a laptop computer, a tablet computer, or a mobile phone handset. In the case where the device 100 is a mobile phone handset, an "optimal" holding position may be one where the local voice is closest to one microphone, e.g. microphone 1a, and the ear of the user is close to one loudspeaker, e.g. loudspeaker 15a. In the case of a device such as a laptop or a tablet computer, the user may handle and position the device in many ways. In all these cases of phones, laptops, tablet computers, or similar devices, the position, handling, and objects around the device often will change during use. In addition, when the user handles the device the user itself may touch and or occlude microphones and loudspeakers, and may change the proximity of parts of his or her body to various elements of the device.

In general, operation the microphones are used to pick up signals from the near-end talker and from sound sources in the environment in and around the device. The loudspeakers are used to play back signals from sound sources outside the surrounding environment. In a two-way voice communication scenario this would include playback of sound acquired from another device at another location. Such a device is referred to as the "far-end" device, and the user of the device as a far-end user. Thus, the local device used by the near-end talker can output from its loudspeakers voice from the far-end user. Given the playback of such sound, if the coupling between the device loudspeakers and microphones is strong enough, and or the playback from the loudspeakers is loud enough, the microphones will also record/acquire signals related to the far-end playback.

When the playback of far-end acquired signals are captured by the microphones on the local device, and these signals are sent to the far-end device for playback to the far-end user, this signal is perceived by the far-end user as an echo. Echo can be picked up simultaneously with desired speech from a near-end talker, often degrading the quality of the desired speech and communication experience and making comprehension difficult. In addition, the local device can also playback signals that do not originate on the far-end device, but in the near-end device itself, such as alerts and music, where it is desirable that such signals be either not recorded by the near-end device or not sent to the far-end user. Effective removal of such echo originating with a far-end signal, and/or what is termed as echo herein though originating locally in the far-end device, is of interest.

The ambient environment of the local voice may contain far field noise sources, including any undesired source of sound that are considered to be in the far field of the sound pick up response of the audio system, where these far field noise sources may also include a competing talker. The audio system may produce inputs of a multi-channel noise suppression process.

A number of microphones 1 (or individually, microphones 1a, 1b) may be integrated within the housing of the audio system, and may have a fixed geometrical relationship to each other. An example is depicted in FIG. 1 having at least two microphones 1, namely microphones 1a and 1b. The microphones can be positioned on different surfaces, e.g. microphone 1a can be on the front (screen) surface of the device and microphone 1b may be on the back surface of the device. This is a typical arrangement for some current devices; however it should be understood that other arrangements of microphones that may be viewed collectively as a microphone array whose geometrical relationship may be fixed and "known" at the time of manufacture are possible, e.g. arrangements of two or more microphones in the housing of a tablet computer, a laptop computer, or a desktop computer.

Beamforming may also be applied to the microphone signals, though this is not essential for all embodiments described herein. In one embodiment, the apparatuses and processes described herein may be implemented in audio systems for homes and vehicles, as well as speakers in consumer electronics devices. The signals from the microphones 1 are digitized, and made available simultaneously or parallel in time, to a beam former. The microphones 1 including their individual sensitivities and directivities may be known and considered when configuring the beam former, or defining each of the beams, such that the microphones 1 are treated as a microphone array. The beam former may be a digital processor that can utilize any suitable combination of the microphone signals in order to produce a number of acoustic pick up beams.

In the embodiment of FIG. 1, there may be situations where microphones 1a, and 1b are receiving near-end talker speech (i.e., a local voice) at the same time that loudspeaker 15a or loudspeaker 15b, or both, are outputting audio signals. In one embodiment, audio signals output from the loudspeakers 15a and/or 15b may include speech from a far-end talker and other far-end audio signals in a 2-way communication system. In one embodiment, audio signals output from the loudspeaker 15*a* or 15*b* may include audio signals generated by the audio system itself. For example, the internally generated audio signals may include media playback (e.g., music, video) and voice prompts from an application.

The audio signal output by the loudspeakers 15*a* and/or 15*b* may be captured by the microphones 1*a* and 1*b* as echo due to various factors such as the proximity of the microphones 1*a* and 1*b* to the loudspeakers 15*a* and 15*b*, the playback levels in the each of the loudspeakers 15*a* and 15*b* or sensitivity of each of the microphones 1*a* and 1*b*. The audio signals received by the microphones therefore typically includes a local voice component as well as an undesired echo component.

The nature of this echo signal, for example its strength and power spectrum, can depend strongly on the handling, position and environment around the device. In one embodiment microphones are on the surface of the device, and such a device may be placed on an object, e.g. a table, where a microphone may be facing or touching the surface. In some cases, this can lower the ability of the microphone to pick up signals from one or more loudspeakers. This may depend on the position of the loudspeakers, known at the time of manufacture. In other cases, this can increase the ability of the microphone to pick up signals from one or more loudspeakers. This may depend on the position of the loudspeakers, known at the time of manufacture. In most cases it changes the transfer function between the signal played out of a loudspeaker and the related signal picked up on the microphone.

In another embodiment the user may be able to handle the device, or change its orientation. In handling the device users may have a general preferred position of their hands, or body, or other environmental object, e.g. a table or mount, relative the device which depends on device orientation. Such handling and orientation, and positioning of the user or expected objects relative the device, can influence the strength and nature of the echo and its coupling on microphones.

In another embodiment the user may be able to handle the device, or change its orientation, and in such cases there is a pre-determined change in the activity and or use of the microphones and loudspeakers. Referring to FIG. 1 as an example, loudspeaker 15*a* may be preferred for a vertical (e.g. portrait) orientation of the device, and loudspeaker 15*b* may be preferred for a horizontal (e.g. landscape) orientation of the device. Such a pre-determined change is set at the time of manufacture and the settings and or design therein is not the subject of the disclosure herein. However, in one embodiment where such loudspeaker and/or microphone activity can change with orientation, or handling of the device, the embodiment notes that the echo properties of the device will then change with orientation and/or handling.

Figure 5:
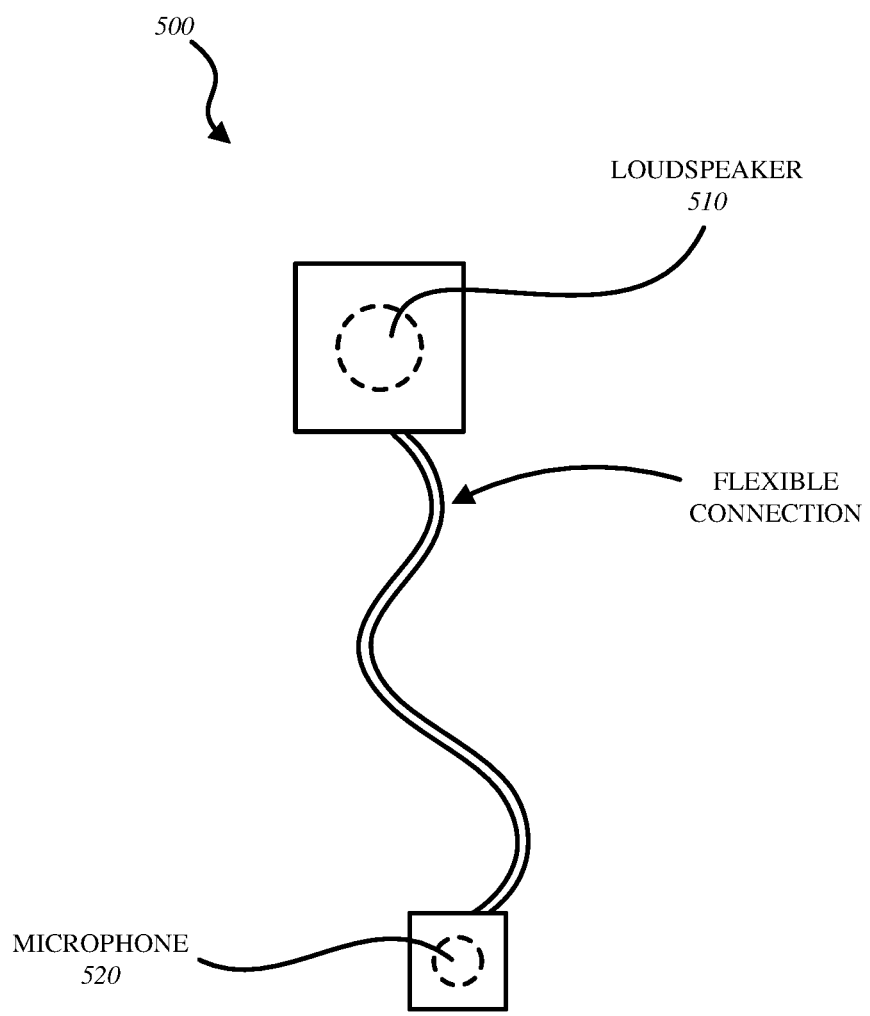
FIG. 5 illustrates a device, such as a headset, for explaining an example audio system, according to an example embodiment.

Turning to the example embodiment illustrated in FIG. 5, there can be portable devices where the relative position of loudspeakers and microphones naturally changes during handling and use. One example is that of a headset 500. In FIG. 5, loudspeaker 510 is connected to a microphone 520 by a flexible connection. In a typical headset, this flexible connection may be a wire enclosed in a flexible material like plastic. During use, the loudspeaker 510 is placed near or in the user's ear. The microphone 520 positions itself naturally some distance below the loudspeaker 510, closer to the user's mouth. Movement of the user and/or handling of the device 500 naturally changes the acoustic coupling between microphones and loudspeakers. In such a situation, both the change in this coupling, and how often it changes, and the degree to which it can change in an interval of time, are important for echo control.

In one embodiment, the device 500 in FIG. 5, or another device connected to this device 500 (e.g. a phone connected to the headset), can detect movement in the device or movement by the user.

In one embodiment the device 500 in FIG. 5, acts to send acquired microphone signals to, and playback signals originating from, another device (e.g. a phone).

Figure 2:
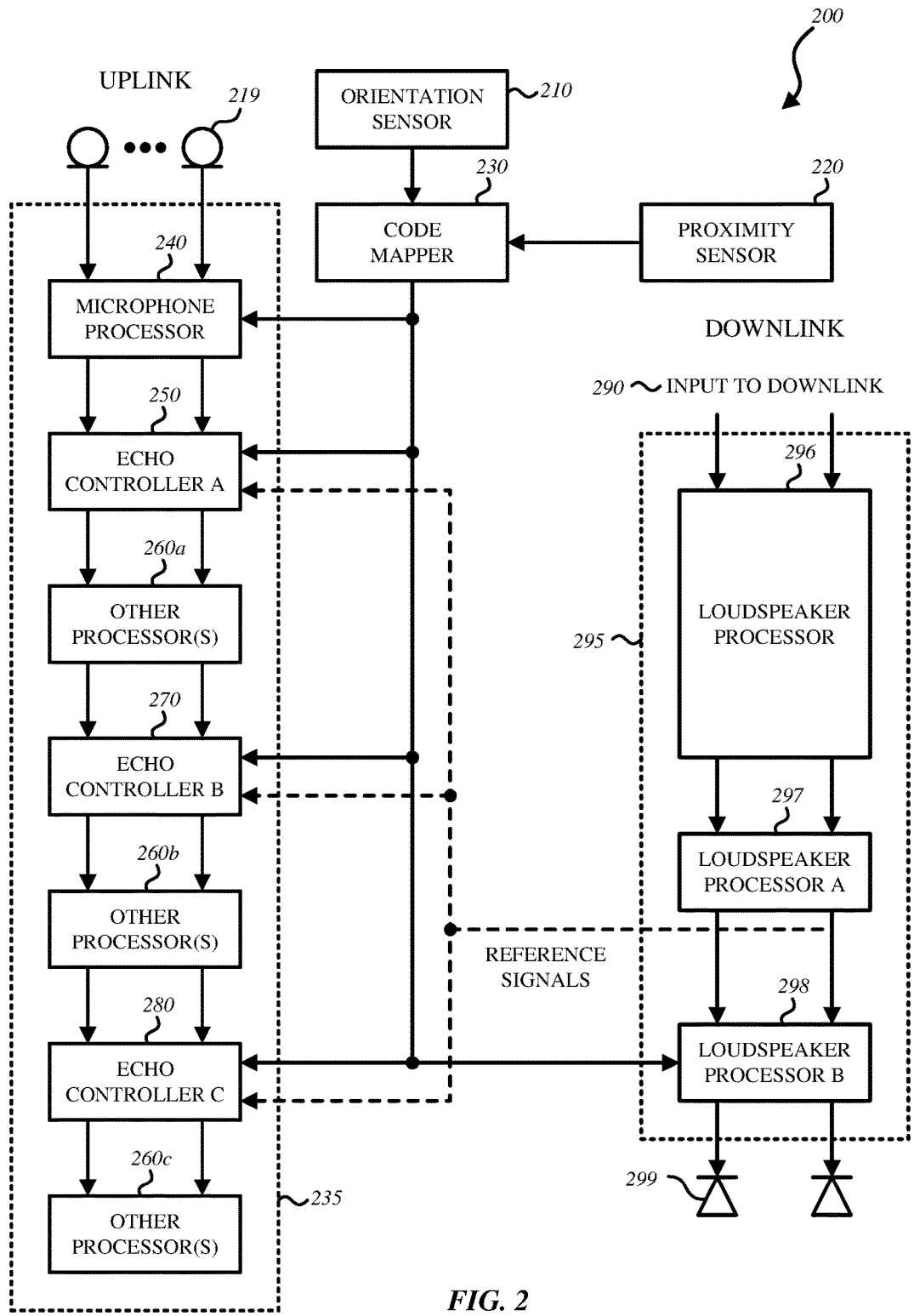
FIG. 2 illustrates a block diagram for explaining an audio system that produces an echo-reduced output audio signal according to an example embodiment.

Turning to FIG. 2, FIG. 2 illustrates an example for explaining an audio system 200 that produces an echo-reduced audio signal. In the embodiment of FIG. 2, microphones 219 may be one of the individual microphones illustrated in FIG. 1 or may be any combination of the individual microphones such that microphones 219 are considered a microphone array or cluster. Audio signals received by the microphones 219 include a local voice component and an echo component. In the embodiment of FIG. 2, the signals from the microphones 219 are digitized, and made available simultaneously or parallel in time, to microphone processor 240.

Also provided to microphone processor 240 is a device state code generated by code mapper 230. In the embodiment of FIG. 2, code mapper 230 receives input from position monitor 210 and proximity detector 220, both of which are included in the audio system 200. Position monitor 210 uses an orientation sensor to monitor a position of the device relative to a frame of reference or a reference axis. The term position as used herein may also refer to an orientation of the device, as discussed below in an embodiment in which the position monitor 210 monitors whether the device is in a landscape orientation or in a portrait orientation.

In another embodiment other sensors such as movement sensors (e.g. accelerometers), cameras, light sensors, can also be used. Movement sensors can detect general motion of the device which implies the environment around the device is changing. Camera and or light sensors can detect objects or light changes around the device. Such a sensor could, for example, imply that the device is resting on a surface (e.g. a table). These sensors, and others, can be part of embodiments described herein.

In one embodiment, position monitor 210 monitors whether the device is in a landscape orientation or in a portrait orientation. In one embodiment, position monitor 210 monitors the device to determine which of various expected holding positions the device is being held (e.g., handset mode vs. speaker phone mode). Position monitor 210 may output the position of the device, for example in an amount of degrees with respect to a reference axis. Position monitor 210 may also output information indicating a change in position of the device. In one embodiment, position monitor 210 may monitor the position of a specific microphone or loudspeaker of the device relative to a frame of reference or reference axis.

Proximity detector 220 uses a proximity sensor to detect proximity of the mobile device to another object. Proximity detector 220 may output a distance between the device, a microphone or a loudspeaker and an object in the surrounding environment. Proximity detector 220 may also output a change in the distance between the device, a microphone or loudspeaker and an object in the surrounding environment. In one embodiment, proximity detector 220 may detect presence of an object proximate to the device, a microphone, or a loudspeaker, and may output an indicator of whether there is or is not a proximate object. For example, proximity detector 220 may detect whether a new object, such as a large surface such as projector screen, has been introduced into an environment. Proximity detector 220 may also detect a change in an object in the environment, such as a window being opened or closed. Other examples of objects that may be monitored by proximity detector 220 in the surrounding environment include a table, a computer screen, a stand for the device, a wall, or part or all of a human body. In one embodiment, proximity detector 220 may be a camera.

In one embodiment, code mapper 230 may also receive input from a motion monitor using a motion sensor that is included in the audio system 200, such as a global positioning system (GPS) receiver, an accelerometer, a speedometer or a pedometer. The motion monitor may monitor movement of the device, such as tilt, shake, rotation or swing. The motion may be monitored relative to a frame of reference. Embodiments involving a motion monitor may be particularly useful in situations where a user is wearing the device on a hand or head, and in situations where a user is in motion (walking, running, riding a bicycle, etc.) These embodiments may also be particularly useful in situations where a microphone may be dangling from a wire of earbuds, a headset or headphones.

In one embodiment, code mapper 230 may also receive input from a temperature sensor that is included in the audio system 200 to detect a temperature of the device itself or to detect air temperature around the device.

Also, in other embodiments, code mapper 230 may receive input from monitors using sensors external to the device, such as an external orientation sensor, proximity sensor, motion sensor, or temperature sensor. These monitors may be included in an external device or located in the surrounding environment of the device. The external device may be any device capable of including such sensors, such as portable telecommunications devices (mobile telephones), desktop computers, laptop computers, headphones, headsets, earbuds, tablet computers and audio systems for homes and vehicles. The external device may have one or more of its own microphones and one or more of its own loudspeakers. As one example of a motion sensor included in an external device, a bicycle may have a speedometer. Another example of a motion sensor included in an external device may be a pedometer in a shoe. One example of an external proximity sensor may be a camera located in a room.

Returning to the embodiment of FIG. 2, code mapper 230 computes a state of the device based on the information received from position monitor 210 and proximity detector 220, and maps the state to an associated device state code. In one embodiment, device state codes are stored in a look up table that includes various states and their respective device state codes. This look up table may have been pre-determined by the device itself, by sensing various conditions in the environment over a period of time, computing states of the device based on the sensed conditions and assigning each state to a respective device state code. For example, the device may compute various states of the device based on information from the position monitor and/or the proximity detector, assign each of the sensed states to a different device state code, and store each of the sensed states and its corresponding device state code in the look up table. There may be more than one state that is assigned the same device state code. In other embodiments, the device state codes may be stored in any suitable manner on a memory accessible to the device. In still other embodiments, a look up table is not used and the device state code is used directly in the echo control process.

In one embodiment, code mapper 230 separately computes a state related to the position of the device based on the orientation information and a state related to the proximity of the device based on the proximity information. Code mapper 230 then separately maps the computed states, each to a different device state code and provides the device state codes to the echo control process. In another embodiment, code mapper 230 combines the orientation and proximity information and considers them together to compute a state of the device, and to map the state of the device to a single device state code.

In one embodiment, the computed state of the device also depends on an expected or selected playback situation, including information regarding active microphones, active loudspeakers and the volume of any active loudspeakers. In this regard, active microphones and loudspeakers of the device depend on the playback situation. This is set at the time of manufacture, and the operation and design of this is not part of the disclosure herein. Rather, the implicit effect this has on the echo control process is noted by one embodiment. In addition, aspects of the echo control process may be dictated by the playback situation. Thus, code mapper 230 may compute a state of the device based on one or more of the following or a change in one or more of the following: one or more microphones being used to receive an audio signal, one or more loudspeakers being used to output an audio signal, a tuning of the one or more loudspeakers, the equalizer applied to one or more of the loudspeakers, processing performed by microphone processor 240, processing performed by echo controllers A, B or C. (Microphone processor 240 and echo controllers A, B or C are discussed in more detail below.) In one embodiment, code mapper 230 computes a state of the device based on one or more of the following or a change in one or more of the following: the geometrical relationship of microphones to each other, the geometrical relationship of loudspeakers to each other, and the geometrical relationship of a microphone to a loudspeaker. In addition, code mapper 230 may compute a state of the device based on the geometrical relationship of acoustic reflectors relative to a loudspeaker or a microphone. In one embodiment, code mapper 230 computes a state of the device based on the directivities and sensitivities of the microphones. In one embodiment, code mapper 230 computes a state of the device based on boundaries of a reference signal which will be discussed in more detail below. Similar to embodiments involving the position monitor 210 and the proximity detector 220, code mapper 230 may consider this information independently or in combination in order to compute the state of the device and to map the state to an associated device state code.

It should be noted that the echo control process described herein does not itself involve selection of active microphones and loudspeakers. Rather, as described above, the active microphones and loudspeakers are dictated by the playback situation of the device and this information may be used by the echo control process described herein to compute a state of the device.

In one embodiment, the device state code indicates a level of strength, or a range of expected strength, of the echo component relative to strength of a reference signal. The device state code may also indicate an amount of time delay between the level of strength of the echo component and the reference signal. The device state code may further indicate a level of non-linear components of the echo.

In some embodiments (discussed in more detail below), an impulse response is computed that represents an estimate of the linear transformation between the reference signal (e.g. the signal sent for playback to one or more loudspeakers) and a corresponding audio signal that is received on a microphone in response to output of the reference signal by the loudspeaker. The impulse response may be computed using various methods and approaches, and the choice of the computation approach may be selected by the device in response to the device state code. The impulse response may be characterized by a time-varying linear filter having a frequency support. In such embodiments, the device state code may indicate a frequency support of an impulse response over a predefined band and/or an expected strength of the impulse response over the predefined frequency band. In such embodiments the device state code may indicate how much we expect the impulse response to change over time, or if it has changed recently, as it could depending on motion of the device or objects around the device.

In one embodiment, the device state code may indicate the expected echo response of the device based on the computed state of the device. For example, the device state code may indicate that the sensed state of the device will result in a strong echo component in the audio signal, or that the sensed state of the device will result in a change in coupling between a microphone and a loudspeaker, or that the sensed state of the device will result in such coupling being highly dynamic in time and/or frequency.

In the embodiment of FIG. 2, the components of uplink 235 include echo controllers A, B and C (250, 270, 280) and other processor(s) 260a, 260b and 260c. Generally, code mapper 230 provides the device state code to the various components of uplink 235, and the parameters of such components are tuned accordingly. Thus, microphone processor 240 processes the audio signals received from microphones 219 based on the device state code received from code mapper 230, and provides the processed audio signals as input to an echo control process (e.g., the process performed by echo controller A 250 in FIG. 2). Microphone processor 240 may also provide the digitized signals from the microphones 219 to the echo control process, such that any of the components used for echo control may also use the digitized signals along with the device state code in the echo control process. In this regard, in the embodiment of FIG. 2, each of the components of uplink 235 and downlink 295 may share with the other components any of the information or data used as input to the component, as well as any information or data generated by the component itself. A component may be communicatively coupled to another component such that information or data input to or generated by the component may be shared as needed to perform echo control.

The echo control process performed by echo controllers A, B and C (250, 270, 280) may include both linear and non-linear echo control algorithms which depend on estimates of echo components in the input signal. The echo control algorithms may include, for example, linear echo cancelers and non-linear echo suppressors and echo gates. Generally, the echo control process begins with a linear algorithm which addresses echo components that can be "linearly" modeled and ends with one or more non-linear algorithms which addresses the echo components remaining in the audio signal. A linear echo control algorithm may leverage a linear echo control model to describe an echo response, e.g. using an estimated impulse response convolved with a reference signal to provide an estimated linear echo on a microphone. The linear echo control algorithm may construct a linear model, either temporarily or over a longer period of time, as a function of one or more parameters including a device state code. For example, the linear echo control algorithm may note that the impulse response it will estimate has changed, or will change often, or will be continuously changing in time and frequency. The impulse response estimation method can change depending on the situation.

A non-linear echo control algorithm may construct a non-linear estimate of the echo or the residual echo remaining after a linear echo control process. One example is to estimate a general power spectrum of the echo or residual echo. Based on this estimate the non-linear echo control algorithm can control the level or echo or residual echo by modifying the signal. This can be done by filtering or suppressing the power in certain frequency bands. The echo control model used to estimate descriptions such as power spectrums can depend on one or more parameters that may be tuned based on a device state code. For example, the non-linear echo control algorithm may note that the impulse response estimated by a linear echo control algorithm, operating before it, has changed, or will change often, or will be continuously changing in time and frequency. The non-linear echo control algorithm can then note that the efficiency of linear echo removal will be influenced based on this information. In particular, information from the linear echo control algorithm to the non-linear algorithm may have an implicit accuracy (e.g. it can be more or less accurate). Also the required suppression of the non-linear algorithm to render an acceptable processed signal will be influenced.

For example, in the embodiment of FIG. 2, echo controller A 250 may be a linear echo canceler used for linear removal of an echo component in the input signal received from microphone processor 240. Echo controller A 250 is provided with processed microphone signals from microphone processor 240, as well as the device state code from code mapper 230. In addition, echo controller A 250 is provided with a reference signal, as shown in FIG. 2. The reference signal may be a signal that is sent to the playback system for output by the loudspeaker. When the reference signal is output by loudspeakers 299, microphones 219 receive the resulting audio signal which includes an echo component as well as a local voice component. In one embodiment, the references signal is a monophonic signal output by the loudspeaker. In some embodiments, there may be multiple reference signals, such that the reference signals are multichannel (e.g., left, right, center, front, rear, etc.) In one embodiment, the reference signal also includes information relating to a volume of the loudspeaker that output the reference signal. In one embodiment, echo controller A 250 determines the relationship between the reference signal output by the loudspeaker and the resulting microphone signal received by the microphones when that reference signal is output. This relationship may be determined by estimating an impulse response between the reference signal and the corresponding microphone signal. The impulse response may be estimated using various methods and approaches, and the choice of approach may be selected in response to the device state code. In one embodiment, the impulse response may be characterized by a time-varying linear filter having a frequency support. Using the impulse response, echo controller A 250 estimates the echo component included in the processed audio signals received from microphone processor 240. This estimation of the linear echo component may be referred to as a linear echo estimate. In one embodiment, the estimated echo component may be removed by subtracting the linear echo estimate from the processed audio signals received from microphone processor 240 and the resulting audio signal is provided to other processor(s) 260a. In one embodiment, the linear echo canceler computes a second linear echo estimate by estimating a time delay between the playback reference signal and the microphone signal, scaling the reference signal and aligning the scaled reference signal with the microphone based on the estimated delay. In one embodiment the estimated time-delay is estimated by the position of a dominant area, for example the position of a main lobe in an impulse response or the position of a strong cross-correlation between a reference signal and a microphone signal, or from an estimated impulse response. In one embodiment, the linear echo canceler computes a second linear echo estimate by scaling the reference signal and aligning the scaled reference signal based on the time delay, and the second linear echo estimate is subtracted from the processed audio signals received from microphone processor 240. In one embodiment, the linear echo canceler may modify a measure of double-talk caused by overlapping output audio signals, a change in the impulse response over a period of time, and/or a level of the echo component. The modification of the measure of double-talk, the change in the impulse response, or the level of the echo component may be based on the device state code.

In one embodiment the modification and calculation of measures, and the use of a second linear echo estimate, by the echo canceler may be determined by the device state code. In particular, for codes which indicate situations where there is a change in the environment, or a quality of the environment, where it is expected the coupling between the loudspeakers and microphones has changed or is expected to change more rapidly than in a nominal condition, the echo canceler may use, or use more aggressively, information from this second linear echo estimate. Such information may be used to determine double-talk measures and adaptation step-sizes. The echo canceler may also be more cautious in determining the double-talk situation since in the case of a rapidly changing coupling it may be more difficult to distinguish near-end signals from signals related to the output of the loudspeaker. The echo canceler may also be more aggressive in the use of its step size noting that when it can make an update in the estimated impulse response such an impulse response may have changed relatively more than usual. The double-talk measures and adaptation step-sizes may be determined by various approaches, and selection of the approach may be based on the device state code. In addition, when and how the double-talk measures and adaptation step sizes are used in the echo control process may be determined in response to the device state code. In this regard, selection of a larger step size allows the estimated impulse response to change more rapidly, but can also have detrimental effects when there is strong overlapping of near-end and output signals.

In the embodiment of FIG. 2, other processor(s) 260a may include noise suppressors, equalizers, gain controllers and other known audio processors that perform noise suppression, equalization, gain control and other audio processing, respectively, on the audio signal received from echo controller A 250.

Echo controller B 270 then performs additional echo control processing. In one embodiment, echo controller B 270 is a non-linear echo suppressor, such as a residual echo suppressor. Echo controller B 270 may estimate the residual echo remaining after processing by echo controller A 250 and other processor(s) 260a. In one embodiment, to estimate the residual echo, echo controller B 270 uses a combination of information received from the preceding components in the signal processing chain, namely microphone processor 240, echo controller A 250, other processor(s) 260a and code mapper 230. This information may include digitized audio signals received from microphones 219, the processed audio signals, the reference signal, the linear echo estimate, the impulse response, etc. In one embodiment, based on a comparison of the estimated residual echo to a threshold, echo controller B 270 suppresses certain sub-bands of the audio signal received from other processor(s) 260a. This threshold may be adjusted based on the device state code received from code mapper 230 or a change in the device state code. In one embodiment, the residual echo suppressor scales the estimated residual echo component up by multiplying the estimated residual echo component by a factor before suppressing the sub-bands of the audio signal. In one embodiment, the residual echo suppressor computes a second linear echo estimate by scaling the reference signal and aligning the scaled reference signal with a main lobe of the audio signal, and uses the second linear echo estimate to estimate the residual echo component.

Echo controller B 270 may provide the audio signal having certain sub-bands suppressed to other processor(s) 260b. Similar to other processor(s) 260a, other processor(s) 260b may include noise suppressors, equalizers, gain controllers and other known audio processors.

Echo controller C 280 then performs additional echo control processing. In one embodiment, echo controller C 280 may be a non-linear echo gate. Similar to echo controllers 250 and 270, echo controller C 280 uses information received from the preceding components in the signal processing chain to estimate a residual echo in the received input signal. In one embodiment, echo controller C 280 may suppress the audio signal output by echo controller A 250 or echo controller B 270 if it determines that the echo component remaining after processing by echo controller A 250 or echo controller B 270 is objectionable in a given situation or for a given application. In one embodiment, the echo gate has a threshold for muting the output audio signal, the threshold being for an acceptable level of the second residual echo component. The echo controller tunes the parameters of the echo control process by adjusting the threshold for muting the output audio signal. The threshold for muting may be one of the following: a threshold of a level of strength of the echo component, a threshold of a level of strength of a linear echo estimate, a threshold of a level of strength of a reference signal, and a threshold of a change in an impulse response over a period of time, the impulse response being between the reference signal and a corresponding audio signal that is received in response to output of the reference signal by the loudspeaker. The threshold may be set in response to the device state code. In one embodiment, echo controller C 280 performs the suppression of the audio signal uniformly across all frequencies of the input signal. As a result, for embodiments involving a two-way communication system, audio system 200 may operate in a half-duplex manner, in which transmissions of signals are allowed in both directions but not at the same time. Of course, in other embodiments, audio system 200 may operate in a full-duplex manner, in which transmissions of signals are allowed in both directions simultaneously.

In one embodiment, the echo gate includes a timer indicating a first period of time, a second period of time and a third period of time. During the first period of time, the echo gate suppresses the output audio signal aggressively (e.g., more often). During the second period of time, the echo gate suppresses the output audio signal less aggressively than in the first period of time. During the third period of time, the echo gate suppresses the output audio signal less aggressively than in the second period of time. The timer may be reset based on the device state code.

Other processor(s) 260*c* then performs audio processing on the audio signal received from echo controller C 280. Similar to other processor(s) 260*a* and 260*b*, other processor(s) 260*c* may include noise suppressors, equalizers, gain controllers and other known audio processors. Although the embodiment of FIG. 2 includes other processor(s) 260*a*, 260*b* and 260*c*, in other embodiments these other processor(s) are not included.

In one embodiment, echo controller A 250, echo controller B 270 and echo controller C 280 perform echo control algorithms that may learn from and adaptively make predictions on data, rather than operating statically. This is especially advantageous in situations where coupling between a microphone and a loudspeaker of a device often changes in both time and frequency. In one embodiment, after initially starting the echo control process, echo controller A 250, echo controller B 270 and echo controller C 280 each generate a coarse startup estimation of the echo component included in their respective input signals. Echo controller A 250, echo controller B 270 and echo controller C 280 may include startup settings to learn modeling parameters more quickly. Utilization of the startup settings may be based on the device state code. In this way, even in situations where there is little information available, the echo controllers may quickly estimate their respective echo components in order to suppress them.

In one embodiment, in response to the device state code, echo controller A 250, echo controller B 270 and echo controller C 280 may tune parameters of the echo control process so as to perform echo control algorithms that do not rely on an accurate linear echo estimate. The echo controllers may also perform echo control algorithms that provide more data and information than the linear echo estimate, such as information regarding properties of the digitized audio signals including whether the signals include a local voice and a relationship between such a local voice and an echo component. For instance, the echo controllers may perform cross correlation comparisons between the reference signal and the digitized audio signals. In one embodiment, cross correlation comparisons may be based on a phase of the reference signal and the digitized audio signals (e.g., a phase of the reference signal matching a phase of each of the digitized audio signals.) In another embodiment, cross correlation comparisons may be based on a magnitude of the reference signal and the digitized audio signals (e.g., a magnitude of the reference signal matching a magnitude of each of the digitized audio signals at some time or frequency.) In a further embodiment, cross correlation comparisons may be based on time-alignment of the reference signal and the digitized audio signals (e.g., whether the reference signal and the digitized audio signals match relative to time.) In this way, it is possible to perform accurate echo control even in situations where the echo controllers under-estimate or over-estimate an echo component or a residual echo component, such as after initially starting the echo control process or during another state where quick learning is necessary. Also in such situations, the echo controllers may treat an estimation of an echo component in a conservative manner. For example, echo controller A may not rely on the echo estimation until there is sufficient data for the echo control algorithms to learn on. As another example, echo controller B may perform additional suppression in order to prevent residual echo.

In one embodiment, after initially starting the echo control process or during another state where quick learning is necessary, echo controller A is in a state of learning during which predictive analysis is being performed on data. Echo controller A may need to converge to a sufficiently accurate linear echo estimate or an impulse response estimate. Determination of whether the echo controller A should enter this state of learning may be based on the device state code. During this convergence, the output from the echo controller A may be used conservatively by echo controllers B and C, since echo controllers B and C expect echo controller A to be in a state of learning or convergence. For example, echo controllers B and C may switch to perform echo control algorithms that do not rely on the linear echo estimate or the impulse response, such as cross correlation comparisons.

In one embodiment, if a device state code or a change in a device state code indicates a change in a surrounding environment of the device, one or more of echo controllers A, B and C switches to a state of learning during which predictive analysis on data is being performed. In one embodiment, if the change in the surrounding environment is extreme, echo controllers A, B and/or C may return to a state of learning similar to that used after initially starting the echo control process. For example, if a device state code or a change in the device state code indicates that there is a sharp change in position of an object in the surrounding environment relative to a microphone or a loudspeaker of a device, echo controller A may need to adjust parameters for the echo control process and may need to converge to a sufficiently accurate linear echo estimate or impulse response estimate. Examples of situations in which a device state code may indicate that a change is sharp include detection of a screen or object near a loudspeaker or near a microphone. For instance, if a microphone is occluded by an object, the microphone signal level may suddenly drop. In addition, if an object moves away from the microphone, the microphone signal level may suddenly rise. The rise or drop in the microphone signal may be, for example, 20 to 30 decibels.

If the device state code indicates that a change is sharp, echo controller A may increase its speed of convergence by using a least mean squares (LMS) algorithm having large filter coefficients. Embodiments relating to increase of an echo controller's speed of convergence are particularly advantageous in situations where coupling between a microphone and a loudspeaker change rapidly and consistently. If the device state code indicates that the echo coupling between loudspeakers and microphones is expected to continuously change, as it may in the case in FIG. 5 where the device state code notes that there is a great deal of motion in the device or the user of the device, echo controller A may change more aspects in the convergence method. However, in such situations where coupling between a microphone and a loudspeaker change rapidly and consistently there may also be cases where it is difficult to monitor the changes in coupling and where the speed of the changes in coupling may be determined by obtaining the speed of motion of the device. In these cases, echo controller A may slow its speed of convergence rather than increasing it, such that it is possible to monitor the changes in coupling. Concurrent in the system, echo controllers B and C will respond accordingly noting the operation of echo controller A, such responses can be made noting the device state code (or change in the device state code).

During the convergence state, or during rapid adaptation of the estimation processes, of echo controller A, echo controllers B and C may switch to perform echo control algorithms that do not rely as heavily on the linear echo estimate or the impulse response, such as cross correlation comparisons. It is therefore advantageous to provide echo controllers A, B and C with the device state code so that an appropriate echo control algorithm may be selected and parameters may be adjusted to construct the appropriate echo control model. In one embodiment, echo controller A estimates a simplified impulse response by correlating a reference signal with the corresponding microphone signal and by identifying a time-delay of a main lobe. The simplified impulse response may be used temporarily during the echo control process. The simplified impulse response may also be used in conjunction with the main impulse response estimated by echo controller A between the reference signal and the corresponding microphone signal. In one embodiment, echo controller A scales the reference signal by some factor and time-aligns the scaled reference signal to the main lobe of the simplified impulse response as a second linear echo estimate. To determine a strength of the echo component relative to a strength of the local voice component, strength of the linear echo estimate may be used, as well as strength of the second linear echo estimate. In addition, strength of the reference signal may be used to determine strength of the echo component relative to a strength of the local voice component. The various strengths (of the echo component, the linear echo estimate, the second linear echo estimate, the reference signal, etc.) may be computed as power spectra in the spectral or frequency domain, or may be computed as energy spectra.

Still referring to FIG. 2, downlink input signals 290 are made available to loudspeaker processor 296, loudspeaker processor A 297 and loudspeaker processor B 298. Loudspeaker processor A 297 and loudspeaker processor B 298 may perform, for example, one or more of the following: volume control, equalization processing and crossover processing. In other embodiments, loudspeakers processors A and B may perform other known loudspeaker processing techniques. In one embodiment, the device state code from code mapper 230 is provided as input to loudspeaker processor B, and loudspeaker processor B processes the downlink input signal based on the device state code to generate a signal to be output by loudspeakers 299. Each of loudspeakers 299 may be, for example, similar to loudspeaker 15a or 15b of FIG. 1. In this regard, the embodiment of FIG. 2 shows 2 loudspeakers 299. However, in other embodiments, the audio system may include any number of loudspeakers, including one.

Although the embodiment of FIG. 2 shows uplink 235 and downlink 295, in other embodiments, the audio system is not a two-way communication system. In such embodiments, the input to loudspeaker processor 296 may be internally generated by a device. For example, the internally generated audio signals may include media playback (e.g., music, video) and voice prompts from an application While the audio system 200 is illustrated with various components of an audio system, it is not intended to represent any particular architecture or manner of interconnecting the components. In addition, the components are not limited to the specific orders used as examples in FIG. 2. Rather, any of the components may be re-ordered, combined or removed, performed in parallel or in serial, as necessary, to achieve the results set forth above. For example, echo controllers performing linear echo control algorithms may be performed in any order. In addition, echo controllers performing nonlinear echo components may be performed in any order. Generally, however, echo controllers performing linear echo control algorithms should perform processing before echo controllers performing nonlinear echo control algorithms.

Furthermore, a component may be communicatively coupled to another component such that information or data input to or generated by the component may be shared as needed to perform echo control. In one embodiment, code mapper 230 may provide the device state code to echo controller A and to loudspeaker processor(s) B. In another embodiment, code mapper 230 may provide the device state code to echo controller B and to loudspeaker processor(s) B. In a further embodiment, code mapper 230 may provide the device state code to echo controller A and to loudspeaker processor(s) B.

Figure 3:
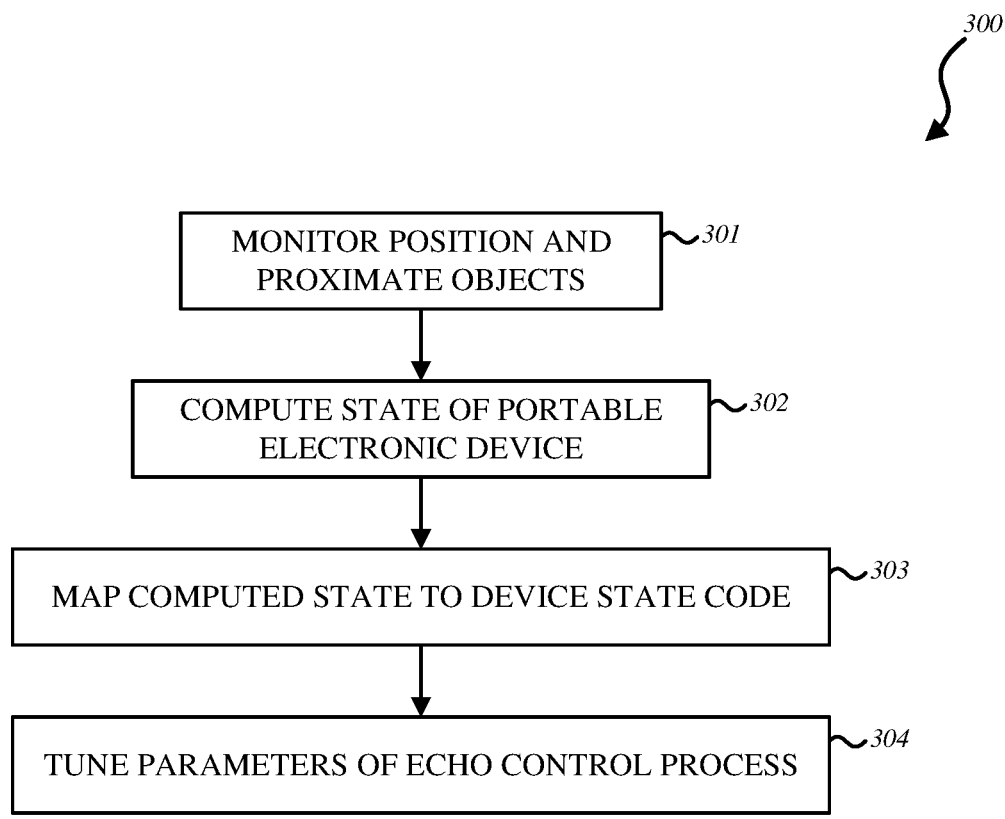
FIG. 3 illustrates a flow chart for explaining an echo control process according to an example embodiment.

FIG. 3 illustrates a flow diagram for explaining an echo control process according to an example embodiment. In this regard, the following embodiments may be described as a process 300, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 300 may be performed by processing logic that includes hardware (e.g. circuitry, dedicated logic, etc.), software (e.g., embodied on a non-transitory computer readable medium), or a combination thereof.

In the embodiment of FIG. 3, a state of the device is computed based on monitoring the position of the device relative to some axis and monitoring the proximity of the device to another object. In other embodiments, and as described with reference to FIG. 2, the state of the device may also be sensed based other information.

In block 301, position of the device relative to a reference frame or axis is monitored by a position monitor using an orientation sensor included in the device. The position of the device may also be monitored for a change in orientation. In this way, the audio system may accommodate for change in echo properties resulting from the orientation of the device, since these properties affect the relationship between the reference signal and the audio signals. For instance, in a case where a device has a loudspeaker on one end of the device (e.g., see the mobile phone of FIG. 1) if the device is orientated such that the loudspeaker is pointing vertically downwards, the loudspeaker may be directed towards a floor, table, or some other surface. In this case, it is expected that the echo component received by the microphones will be different in strength than in a case where the loudspeaker is directed differently, such as horizontally or vertically upward.

Also in block 301, proximity of the device to another object is monitored by a proximity detector using a proximity sensor included in the device. For example, if a device such as a cell phone and or headphone is held to a user's ear, the proximity detector may detect the distance between the ear and the loudspeaker being used. In one embodiment, a distance or a change in the distance may be detected in block 301. As another example, the proximity detector may also monitor the distance between the loudspeaker or microphone being used and other objects in the surrounding environment, such as a floor, table or other surface. In one embodiment, in block 301, a proximity detector detects whether a new object has been introduced into the environment surrounding the device, or whether a position of an external object has moved relative to the device.

In block 302, a state of the device and the surrounding environment is computed from the sensor information obtained in block 301. This process is described in detail with reference to FIG. 2 and will not be described again here.

In block 303, after the audio system computes the state of the device, the look up table is accessed in order to match the computed state to an associated device state code according to one embodiment. As previously mentioned, in other embodiments, a look up table is not used. In one embodiment, the state is represented by a numerical value (e.g., distance of a proximate object, temperature, etc.), and the audio system looks for a device state code that matches the numerical value. The device state code may be an exact match, or may match within some range (e.g., within 5% of a particular value). In one embodiment, the state is represented by a qualitative variable (e.g., running, walking, handheld orientation, etc.), and the audio system looks for a device state code that matches the qualitative variable.

In block 304, the audio system tunes the parameters of the echo control process based on the device state code or a change in the device state code. In one embodiment, based on the device state code, the audio system tune parameters to cause a change in the sensitivities of the echo controller C (which may be, for example, an echo gate). For example, the sensitivities of the echo controller C may be changed in response to a device state code to be more sensitive to the echo control model parameters for echo controller A and/or echo controller B. The sensitivities of the echo controller C may also be changed to be less sensitive to the echo control model parameters for echo controller A and/or echo controller B. In one embodiment, echo controller C may have a muting threshold above which an audio signal is suppressed and below which the audio signal is not suppressed. Accordingly, if the muting threshold is lowered in response to a device state code or a change in a device state code, the audio system will mute the audio signal more often than if the muting threshold is raised. The muting threshold may be based on various characteristics of the echo. In one embodiment, echo controller C may have a muting threshold based on a strength of an echo component to determine whether to suppress an audio signal (which may be output by echo controller A, echo controller B or any of the other processors). In one embodiment, echo controller C may have a muting threshold based on a strength of a linear echo estimate to determine whether to suppress an audio signal. In one embodiment, echo controller C may have a muting threshold based on a strength of a reference signal to determine whether to suppress an audio signal. In one embodiment, echo controller C may have a muting threshold based on a change in an impulse response between one audio frame and another audio frame to determine whether to suppress an audio signal. The various strengths (of the echo component, the linear echo estimate, the reference signal) may be computed as power spectra in the spectral or frequency domain, or may be computed as energy spectra.

Embodiments involving lowering the muting threshold to increase the frequency of muting an audio signal may be particularly useful in cases in which it is more desirable to suppress echo components than to maintain quality of a desired local voice. On the other hand, embodiments involving raising the muting threshold to decrease the frequency of muting an audio signal may be particularly useful in cases in which it is expected that characteristics of the echo (e.g., strength of an echo component, strength of a linear echo estimate, strength of a reference signal, change of an impulse response between one audio frame and another audio frame) will change rapidly with respect to time or frequency. In addition, embodiments involving raising the muting threshold may be particularly useful in situations where one or more characteristics of the echo (e.g., strength of an echo component, strength of a linear echo estimate, strength of a reference signal, change of an impulse response between one audio frame and another audio frame) include unexpected peaks, for instance if there are objects in motion in the environment surrounding the device.

In one embodiment, if a device state code or a change in a device state code indicates a non-trivial change in orientation of the device or a change in a surrounding environment of the device, one or more of echo controllers A, B and C switches to a state of learning during which predictive analysis on data is being performed. This embodiment is discussed in detail with reference to FIG. 2 and will therefore not be discussed again here.

In one embodiment, if a device state code or a change in a device state code indicates a non-trivial change in orientation of the device or a change in a surrounding environment of the device, it may be more desirable to suppress echo components than to maintain quality of a desired local voice and the parameters of echo controller B may be adjusted to suppress the audio signal (including the echo component and the local voice component) more frequently. In one embodiment, echo controller B scales the estimated residual echo by some factor to increase the estimated residual echo. This is particularly useful in situations where echo controller A may estimate the linear echo estimate inaccurately, for example after initialization of startup or in cases where a device state code indicates an extreme change in the state of the device. In one embodiment, echo controller B may use a time-aligned and scaled reference signal as a second linear echo estimate, similar to that discussed above, in order to estimate the residual echo component. In one embodiment, echo controller B may have a suppression threshold above which an audio signal is suppressed and below which an audio signal is not suppressed, and the threshold is lowered so as to perform suppression of the audio signal more often. The muting threshold may be based on various characteristics of the echo, as discussed above. On the other hand, there may also be situations where echo controller B scales the estimate residual echo by some factor to decrease the estimate residual echo. In addition, in other embodiments, echo controller B may increase the threshold so as to preform suppression of the audio signal less often.

In one embodiment, if a device state code or a change in a device state code indicates a non-trivial change in orientation of the device or a change in a surrounding environment of the device, the audio system may respond by changing the information that is shared between echo controllers A, B and C. In one embodiment, the audio system responds to the device state code or a change in the device state code without re-initializing the echo control process and without interrupting audio playback process. In this way, the audio system is able to react to a state of the device or a change in the state of the device dynamically and without interrupting operation. For example, without fully re-setting or re-initializing an echo control process, based on the device state code, the echo controller A may reset a startup flag to signal to echo controllers B or C that it is in a learning state in which it is re-learning parameters for the echo control model and converging to a sufficiently accurate impulse response. This is particularly advantageous because echo controller A does not have to re-converge to a sufficiently accurate linear echo estimate or an impulse response estimate. As another example, echo controller A may substitute a time-aligned and scaled reference signal (as discussed above) for the linear echo estimate. As a further example, echo controller A may change any other echo model parameters that are shared with echo controllers B and C, such as parameters for double-talk, estimating impulse response and estimating strength of an echo component.

In one embodiment, properties of coupling between a microphone and a loudspeaker may be determined from a device state code. For example, all of the following may be derived from a device state code: (i) a relationship between an echo component and a reference signal, which may be based on an impulse response; (ii) a time delay between the reference signal and the echo component included in the corresponding microphone signal received when reference signal is output from the loudspeaker, which may be based on time-alignment of an impulse response; (iii) a frequency support of the impulse response; (iv) an expected strength of the impulse response across frequencies of the audio signal; and (v) a strength of non-linear echo components. The echo controllers may determine the coupling properties associated with a device state code to adjust echo control accordingly.

In one embodiment, the audio system's response to the device state code or a change in the device state code is temporary, such that echo control is adjusted for a predetermined period of time and then is returned to its previous state.

Figure 4:
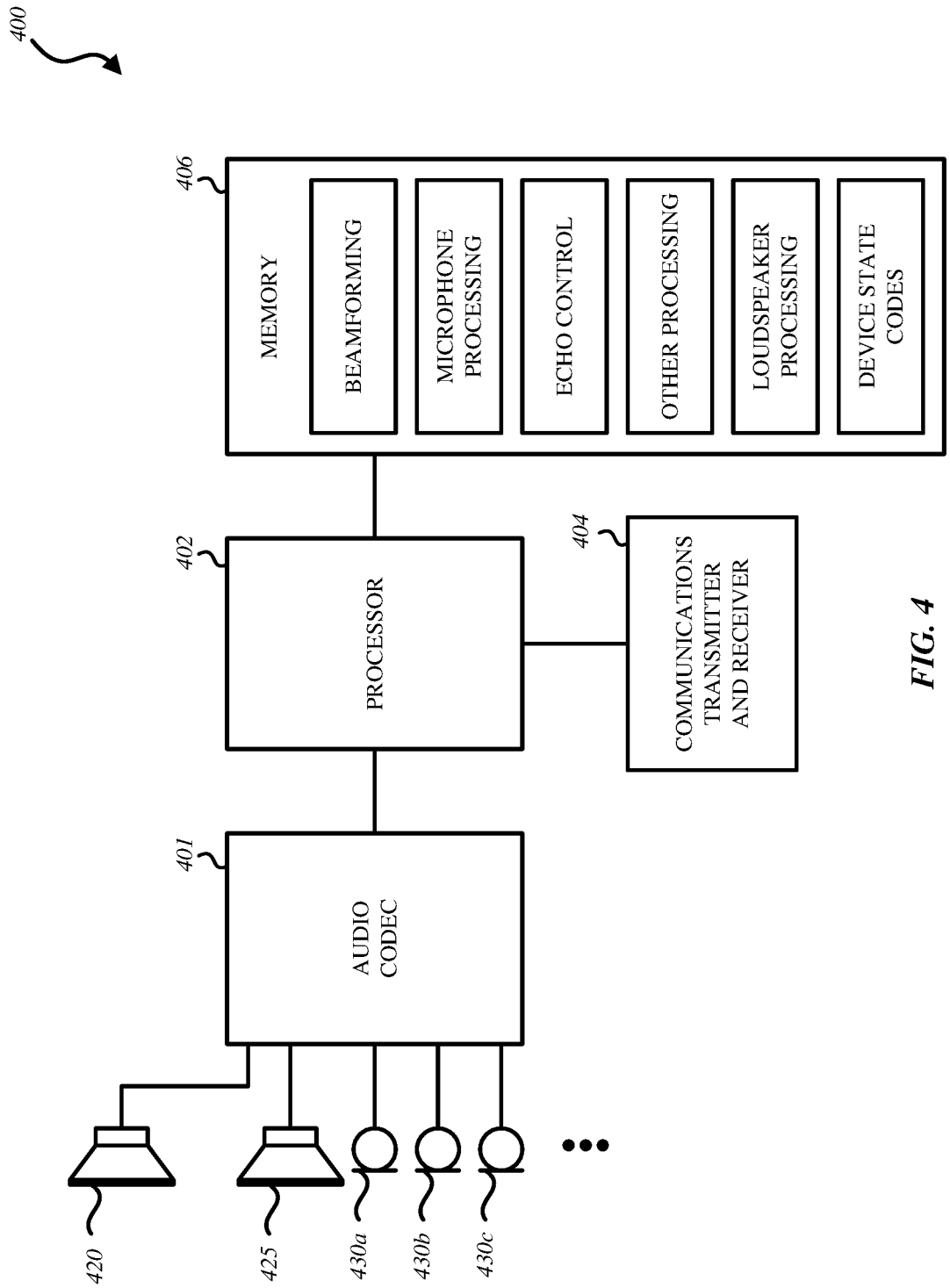
FIG. 4 illustrates an example implementation of the audio system that has a programmed processor according to an example embodiment.

FIG. 4 is an example implementation of the audio systems described above in connection with FIG. 2, that has a programmed processor 402. The components shown may be integrated within a housing such as that of a mobile phone (e.g., see FIG. 1.) These include a number of microphones 430 (430a, 430b, 430c, . . . ) which may have a fixed geometrical relationship to each other and loudspeakers 420 and 425 which also may have a fixed geometrical relationship to each other. Microphones 430 may also have a fixed geometrical relationship to loudspeakers 420 and 425. The audio signals may be provided to the processor 402 and/or to a memory 406 (e.g., solid state non-volatile memory) for storage, in digital, discrete time format, by an audio codec 401. The processor 402 may also provide the audio signals to a communications transmitter and receiver 404, e.g., as an uplink communications signal of an ongoing phone call.

The memory 406 has stored therein instructions that when executed by the processor 402 produce the acoustic pickup beams using the microphone signals, monitor a state of a device, compute a state of a device, map the state to a device state code and tune parameters of an echo control process (as described above in connection with FIGS. 1-3). The instructions that program the processor 402 to perform all of the processes described above, or to implement beamforming, microphone processing, echo control (such as echo control A, B and/or C), loudspeaker processing (including loudspeaker processing A and/or B), and any other processing, are all referenced in FIG. 4 as being stored in the memory 406 (labeled by their descriptive names, respectively.) These instructions may alternatively be those that program the processor 402 to perform the processes, or implement the components described above in connection with the embodiment of FIG. 2. Note that some of these circuit components, and their associated digital signal processes, may be alternatively implemented by hardwired logic circuits (e.g., dedicated digital filter blocks, hardwired state machines.) In the embodiment of FIG. 4, memory 406 also has stored therein device state codes, as described above. In other embodiments, the device state codes may be stored in any suitable computer-readable storage medium.

FIG. 4 is merely one example of a particular implementation and is merely to illustrate the types of components that may be present in the audio system. While the audio system 400 is illustrated with various components of a data processing system, it is not intended to represent any particular architecture or manner of interconnecting the components; as such details are not germane to the embodiments herein. It will also be appreciated that network computers, handheld computers, mobile phones, servers, audio systems for homes, audio systems for vehicles, and/or other data processing systems which have fewer components or perhaps more components may also be used with the embodiments herein. Accordingly, the processes described herein are not limited to use with the hardware and software of FIG. 4.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio system may be performed by one or more programmable processors executing one or more computer programs stored on a non-transitory computer readable storage medium to perform the functions of the system. All or part of the audio system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain embodiments have been described and shown in the accompanying drawings, it is to be understood that such embodiments are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

The invention claimed is:

1. A device comprising:
a loudspeaker in a housing;
a microphone array in the housing, the microphone array being positioned to receive an audio signal including a near-end voice component and an echo component;
a position monitor that uses an orientation sensor in the housing to monitor a position of the device relative to a frame of reference;
a motion monitor that uses a motion sensor in the housing to monitor movement of the device;
a proximity detector that uses a proximity sensor or video sensor in the housing to detect presence of an object proximate to the device; and
an echo controller configured to compute a state of the device during use of the device based on one or more of the position of the device, the motion of the device, or the detected presence of the object, to map the computed state of the device to a predetermined device state code selected from among a plurality of predetermined device state codes stored on the device, and to tune parameters of an echo control process according to the selected device state code during use of the device without re-initializing the echo control process.

2. The device of claim 1, wherein the echo controller comprises a linear echo canceler that computes an impulse response between a reference signal and a corresponding echo component that is received on the microphone in response to output of the reference signal by the loudspeaker, that computes a linear echo estimate by estimating the echo component using the impulse response, and that cancels the echo component by subtracting the linear echo estimate from the audio signal.

3. The device of claim 2, wherein the echo controller further comprises a residual echo suppressor that estimates a residual echo component remaining after the linear echo canceller cancels the echo component and, based on a comparison of the estimated residual echo component to a threshold, suppresses certain sub-bands of the audio signal, and
wherein the estimation is based on one or more of the following: the audio signal, the reference signal, the impulse response and the linear echo estimate.

4. The device of claim 3, wherein the echo controller further comprises an echo gate that estimates a second residual echo component remaining after the residual echo suppressor suppresses the certain sub-bands of the audio signal and, based on the estimated second residual echo component, suppresses the audio signal, and
wherein the estimation is based on one or more of the following: the audio signal, the reference signal, the impulse response and the linear echo estimate.

5. The device of claim 1, wherein the echo controller computes an impulse response between a reference signal and a corresponding echo component that is received on the microphone in response to output of the reference signal by the loudspeaker, the impulse response being characterized by a time-varying linear filter, and
wherein the plurality of device state codes indicate two or more of the following about the device: (i) a level of strength of the echo component relative to a level of strength of the reference signal, (ii) a change in the level of strength of the echo component relative to strength of the reference signal, (iii) a change in the impulse response, (iv) a change in amount of time delay between the echo component received on the microphone and the reference signal, (v) a change in the impulse response over a predefined frequency band, (vi) a change in an expected strength of the impulse response over the predefined frequency band, and (vii) a change in the level of echo components which are not linearly related to the reference signal,
and wherein the computation of the impulse response is based on the selected device state code.

6. The device of claim 4, wherein the echo controller tunes the parameters of the echo gate by adjusting a threshold for muting the audio signal, and wherein the threshold for muting is one of the following: a threshold of a level of strength of the echo component, a threshold of a level of strength of a linear echo estimate, a threshold of a level of strength of a reference signal, a relative level between a residual echo estimate and an estimate of signal components received on the microphone that are not related to echo, and a threshold of a change in an impulse response over a period of time, the impulse response being between the reference signal and a corresponding echo component that is received on the microphone in response to output of the reference signal by the loudspeaker,
and wherein the threshold is adjusted based on the device state code.

7. The device of claim 2, wherein the linear echo canceler is tuned based on the device state code, and computes an adaptation speed that controls how fast the linear echo canceler is able to change the estimated impulse response, and
wherein the adaptation speed is determined by the tuning of the echo canceler.

8. The device of claim 2, wherein the linear echo canceler is tuned based on the device state code, and computes a second linear echo estimate by estimating a time delay between a second reference signal and a corresponding second reference echo component that is received on the microphone, scaling the reference signal and aligning the scaled reference signal with the audio signal based on the estimated time delay, and wherein the tuning of the linear echo canceler determines when and how the second linear echo estimate is used to cancel the echo component.

9. The device of claim 3, wherein the residual echo suppressor is tuned based on the device state code,
wherein the residual echo suppressor computes a second linear echo estimate and scales the estimated residual echo component up by multiplying the estimated residual echo component by a factor, wherein the tuning of the residual echo suppressor determines when and how the second linear echo estimate is used to cancel the echo component.

10. The device of claim 3, wherein the residual echo suppressor computes a second linear echo estimate by scaling the reference signal and aligning the scaled reference signal according to a time delay estimate, and uses the second linear echo estimate to estimate the residual echo component based on the device state code.

11. The device of claim 2, wherein the linear echo canceler resets a startup flag without re-initializing the echo control process to notify the echo controller that the linear echo canceler is in a state of learning, wherein the startup flag may be reset based on the device state code.

12. The device of claim 4, wherein the echo gate includes a timer indicating a first period of time, a second period of time and a third period of time,
wherein during the first period of time, the echo gate suppresses the audio signal aggressively, wherein during the second period of time, the echo gate suppresses the audio signal less aggressively than in the first period of time, wherein during the third period of time, the echo gate suppresses the audio signal less aggressively than in the second period of time, and wherein the echo controller tunes the parameters of the echo control process by resetting the timer based on the device state code.

13. A method for a device including a loudspeaker in a housing, a microphone array in the housing, the microphone array being positioned to receive an audio signal including a near-end voice component and an echo component, the method comprising:

monitoring, using an orientation sensor in the housing, a position of the device relative to a frame of reference;

monitoring, using a motion sensor in the housing, movement of the device;

detecting, using a proximity sensor in the housing, presence of an object proximate to the device;

computing a state of the device during use of the device based on one or more of the position of the device, the motion of the device, and the detected presence of the object;

mapping the computed state of the device to a predetermined device state code selected from among a plurality of predetermined device state codes stored on the device; and tuning parameters of an echo control process according to the associated device state code during use of the device without re-initializing the echo control process.

14. The method of claim 13, wherein the echo control process comprises a linear echo cancellation process that computes an impulse response between a reference signal and a corresponding echo component that is received on the microphone in response to output of the reference signal by the loudspeaker, that computes a linear echo estimate by estimating the echo component using the impulse response, and that cancels the echo component by subtracting the linear echo estimate from the audio signal.

15. The method of claim 14, wherein the echo control process further comprises a residual echo suppression process that estimates a residual echo component remaining after the linear echo cancellation process cancels the echo component and, based on a comparison of the estimated residual echo component to a threshold, suppresses certain sub-bands of the audio signal, and wherein the estimation is based on one or more of the following: the audio signal, the reference signal, the impulse response and the linear echo estimate, wherein the degree of suppression is a tunable parameter which can be influenced by a device state code.

16. The method of claim 15, wherein the echo control process further comprises an echo gating process that estimates a second residual echo component remaining after the residual echo suppression process suppresses the certain sub-bands of the audio signal and, based on the estimated second residual echo component, suppresses the audio signal, and wherein the estimation is based on one or more of the following: the audio signal, the reference signal, the impulse response and the linear echo estimate.

17. The method of claim 13, wherein the echo control process further comprises computing an impulse response between a reference signal and a corresponding echo component that is received on the microphone in response to output of the reference signal by the loudspeaker, the impulse response being characterized by a time-varying linear filter, and wherein the plurality of device state codes indicate two or more of the following about the device: (i) a level of strength of the echo component relative to a level of strength of the reference signal, (ii) a change in the level of strength of the echo component relative to strength of the reference signal, (iii) a change in the impulse response between the reference signal and the corresponding echo component received on the microphone, (iv) a change in amount of time delay between the echo component received on the microphone and the reference signal, (v) a change in the impulse response over a predefined frequency band, (vi) a change in an expected strength of the impulse response over the predefined frequency band, and (vii) a change in the level the echo components which are not linearly related to the reference signal, and wherein computation of the impulse response is based on the selected device state code.

18. The method of claim 16, wherein the parameters of the echo gating process are tuned by adjusting a threshold for muting the audio signal, and wherein the threshold for muting is one of the following: a threshold of a level of strength of the echo component, a threshold of a level of strength of a linear echo estimate, a threshold of a level of strength of a reference signal, a relative level between a residual echo estimate and an estimate of signal components received on the microphone that are not related to echo, and a threshold of a change in an impulse response over a period of time, the impulse response being between the reference signal and a corresponding echo component that is received on the microphone in response to output of the reference signal by the loudspeaker, and wherein the threshold is adjusted based on the device state code.

19. The method of claim 14, wherein the linear echo cancellation process is tuned based on the device state code, and computes an adaptation speed that controls how fast the linear echo cancellation process is able to change the estimated impulse response, and wherein the adaptation speed is determined by the tuning of the linear echo cancellation process.

20. The method of claim 14, wherein the linear echo cancellation process is tuned based on the device state code, and computes a second linear echo estimate by estimating a time delay between a second reference signal and a corresponding second reference echo component that is received on the microphone, scaling the reference signal and aligning the scaled reference signal with the audio signal based on the estimated time delay, and wherein the tuning of the linear echo canceler determines when and how the second linear echo estimate is used to cancel the echo component.

21. The method of claim 15, wherein the residual echo suppression process is tuned based on the device state code, wherein the residual echo suppression process computes a second linear echo estimate and scales the estimated residual echo component up by multiplying the estimated residual echo component by a factor, wherein the tuning of the residual echo suppression process determines when and how the second linear echo estimate is used to cancel the echo component.

22. The method of claim 15, wherein the residual echo suppression process computes a second linear echo estimate by scaling the reference signal and aligning the scaled reference signal according to a time delay estimate, and uses the second linear echo estimate to estimate the residual echo component based on the device state code.

23. The method of claim 14, wherein the linear echo cancellation process resets a startup flag without re-initializing the echo control process to notify the echo controller that the linear echo canceler is in a state of learning, wherein the startup flag may be reset based on the device state code.

24. The method of claim 16, wherein the echo gating process uses a timer indicating a first period of time, a second period of time and a third period of time,
- wherein during the first period of time, the echo gating process suppresses the audio signal aggressively,
- wherein during the second period of time, the echo gating process suppresses the audio signal less aggressively than in the first period of time,
- wherein during the third period of time, the echo gating process suppresses the audio signal less aggressively than in the second period of time, and
- wherein the parameters of the echo control process are tuned by resetting the timer based on the associated device state code.

* * * * *